United States Patent
Burlutskiy

(10) Patent No.: US 9,402,518 B2
(45) Date of Patent: Aug. 2, 2016

(54) APPARATUS AND METHOD FOR CONTROLLING CLEANING IN ROBOTIC CLEANER

(71) Applicant: Samsung Electronics Co., Ltd, Gyeonggi-do (KR)

(72) Inventor: Nikolay Burlutskiy, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 13/762,971

(22) Filed: Feb. 8, 2013

(65) Prior Publication Data

US 2013/0206177 A1    Aug. 15, 2013

(30) Foreign Application Priority Data

Feb. 9, 2012  (KR) .................. 10-2012-0013190

(51) Int. Cl.
| | |
|---|---|
| *A47L 9/00* | (2006.01) |
| *A47L 9/28* | (2006.01) |
| *G05D 1/02* | (2006.01) |

(52) U.S. Cl.
CPC .............. *A47L 9/009* (2013.01); *A47L 9/2805* (2013.01); *G05D 1/0274* (2013.01); *A47L 2201/04* (2013.01); *G05D 2201/0203* (2013.01)

(58) Field of Classification Search
CPC . A47L 2201/00; A47L 9/2805; A47L 9/2842; A47L 9/2857; A47L 9/2889
USPC ................. 15/3, 50.1–50.3, 319, 320, 321
See application file for complete search history.

(56) References Cited

U.S. PATENT DOCUMENTS

| | | | |
|---|---|---|---|
| 7,805,220 B2 | 9/2010 | Taylor et al. | |
| 8,382,906 B2 * | 2/2013 | Konandreas et al. | 134/6 |
| 8,438,695 B2 * | 5/2013 | Gilbert et al. | 15/319 |
| 2005/0000543 A1 * | 1/2005 | Taylor et al. | 134/18 |
| 2007/0021867 A1 | 1/2007 | Woo | |
| 2009/0055020 A1 | 2/2009 | Jeong et al. | |
| 2010/0161225 A1 * | 6/2010 | Hyung et al. | 701/301 |
| 2011/0077802 A1 | 3/2011 | Halloran et al. | |
| 2011/0122221 A1 | 5/2011 | Su et al. | |
| 2011/0167574 A1 * | 7/2011 | Stout et al. | 15/3 |

FOREIGN PATENT DOCUMENTS

| | | |
|---|---|---|
| JP | 2008-148281 | 6/2008 |
| KR | 10-0821162 | 4/2008 |
| KR | 10-2009-0077547 | 7/2009 |
| KR | 10-2010-0012351 | 2/2010 |

OTHER PUBLICATIONS

International Search Report dated May 9, 2013 in connection with International Application No. PCT/KR2013/000225, 3 pages.
Written Opinion of the International Searching Authority dated May 9, 2013 in connection with International Application No. PCT/KR2013/000225, 6 pages.
Extended European Search Report dated Oct. 19, 2015 in connection with European Application No. 13746951.6, 5 pages.

* cited by examiner

*Primary Examiner* — Robert Scruggs

(57) ABSTRACT

An operation of a robotic cleaner includes generating at least one map including information regarding a space to be cleaned by using information measured by at least one sensor. The operation also includes setting a cleaning path by using the at least one map, and cleaning according to the cleaning path.

22 Claims, 8 Drawing Sheets

APPARATUS AND METHOD FOR CONTROLLING CLEANING IN ROBOTIC CLEANER

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Feb. 9, 2012 and assigned Serial No. 10-2012-0013190, the entire disclosure of which is hereby incorporated by reference.

TECHNICAL FIELD OF THE INVENTION

The present disclosure relates to a robotic cleaner.

BACKGROUND OF THE INVENTION

A robotic cleaner is an apparatus for performing a cleaning operation which sucks dust and debris from a floor surface while travelling autonomously within a cleaning area to be cleaned without a user's manipulation. The robotic cleaner uses a sensor to determine a distance to an obstacle such as furniture, office supplies, walls, and the like, located in the cleaning area, and cleans the cleaning area while controlling not to collide with the obstacle by using the determined information. However, when the robotic cleaner performs a cleaning operation, a security operation, or the like, items necessary for cleaning (e.g., an operation type, an operation area, an object, and the like) must be determined one by one, which is inconvenient to users.

SUMMARY OF THE INVENTION

To address the above-discussed deficiencies of the prior art, it is a primary aspect of the present disclosure to provide an apparatus and method for effective cleaning in a robotic cleaner.

Another aspect of the present disclosure is to provide an apparatus and method for generating maps for cleaning in a robotic cleaner.

Another aspect of the present disclosure is to provide an apparatus and method for cleaning by using maps which indicate information related to activity, reachability, cleanness, and cleaning faults in a robotic cleaner.

In accordance with an aspect of the present disclosure, a method of operating a robotic cleaner is provided. The method includes generating at least one map including information regarding a space to be cleaned by using information measured by at least one sensor. The method also includes setting a cleaning path by using the at least one map, and cleaning according to the cleaning path. The at least one map includes at least one of a first map that indicates a cleaning complete state, a second map that indicates activity of dynamic objects, a third map that indicates reachability of the robotic cleaner, a fourth map that indicates a cleaning state, and a fifth map that indicates an area difficult to be cleaned.

In accordance with another aspect of the present disclosure, a robotic cleaner apparatus is provided. The apparatus includes a suction unit configured to suck air and collect dust on a floor under the control of a controller. The apparatus also includes a driving unit configured to provide physical power for moving the robotic cleaner under the control of the controller. The apparatus also includes the controller configured to provide control to generate at least one map including information regarding a space to be cleaned by using information measured by at least one sensor, to set a cleaning path by using the at least one map, and to perform cleaning according to the cleaning path. The at least one map includes at least one of a first map that indicates a cleaning complete state, a second map that indicates activity of dynamic objects, a third map that indicates reachability of the robotic cleaner, a fourth map that indicates a cleaning state, and a fifth map that indicates an area difficult to be cleaned.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system The present disclosure relates to a robotic cleaner for smart cleaning. The robotic cleaner uses environmental and statistical information for effective, reliable, and fast cleaning. The information includes data regarding a location and size of obstacles (e.g., furniture) and dynamic objects (e.g., a human user or a pet). The information may further include statistical information such as an activity rate of the dynamic object. The robotic cleaner has a capability for analyzing a covered area, and makes an optimal decision for faster cleaning. In the present disclosure, the robotic cleaner starts cleaning from an area easy to be cleaned to an area difficult to be cleaned. Further, the robotic cleaner includes a module for interacting with a user, and can propose to perform additional cleaning, updating of a cleaning state, and the like.

Figure 1:
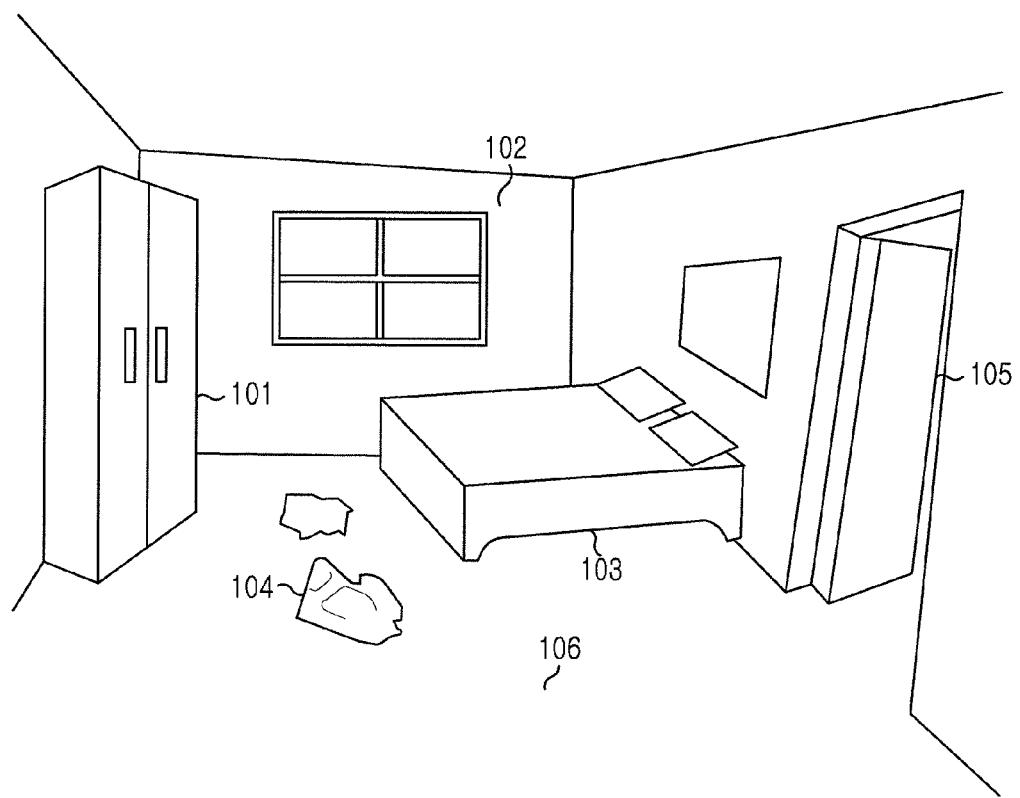
FIG. 1 illustrates an example of a bedroom including objects recognized by a robotic cleaner.

FIG. 1 illustrates an example of a bedroom including objects recognized by a robotic cleaner. Referring to FIG. 1, the objects include a closet 101, a wall 102, a bed 103, clothes 104, a door 105, and a floor 106 to be cleaned. To recognize the objects, the robotic cleaner can include a camera, a laser ranger, a sonar, a bump sensor, and other sensors that can be used and placed in the robotic cleaner. After receiving raw data from at least one of the sensors, the robotic cleaner classifies the objects into groups by using a 2 Dimension (2D) or 3 Dimension (3D) image reconfiguration algorithm.

Although image processing is used to complete initial classification of the object, the object classification can be updated by using related information over time in which the robotic cleaner collects information regarding a location, property, and state of the object. All objects can have a 3D model, and are mapped to a 3D map of a house. The map can be stored in a storage element included in the robotic cleaner or can be stored in a server to which the robotic cleaner can access by means of Wireless Fidelity (WiFi) or another communication element. Each object on the 3D map can have both a static characteristic and a dynamic characteristic. For furniture, the static characteristic can include a name, a color, a material, and the like. The dynamic characteristic is not limited, but can include a location and active state of the object. For example, for the closet 101, the active state implies whether it is open or closed. After entirely mapping the house, the robotic cleaner builds a 3D map of the house to be cleaned. The map is used to compare a current state of the house with a desired state of the house to be cleaned.

Figure 2:
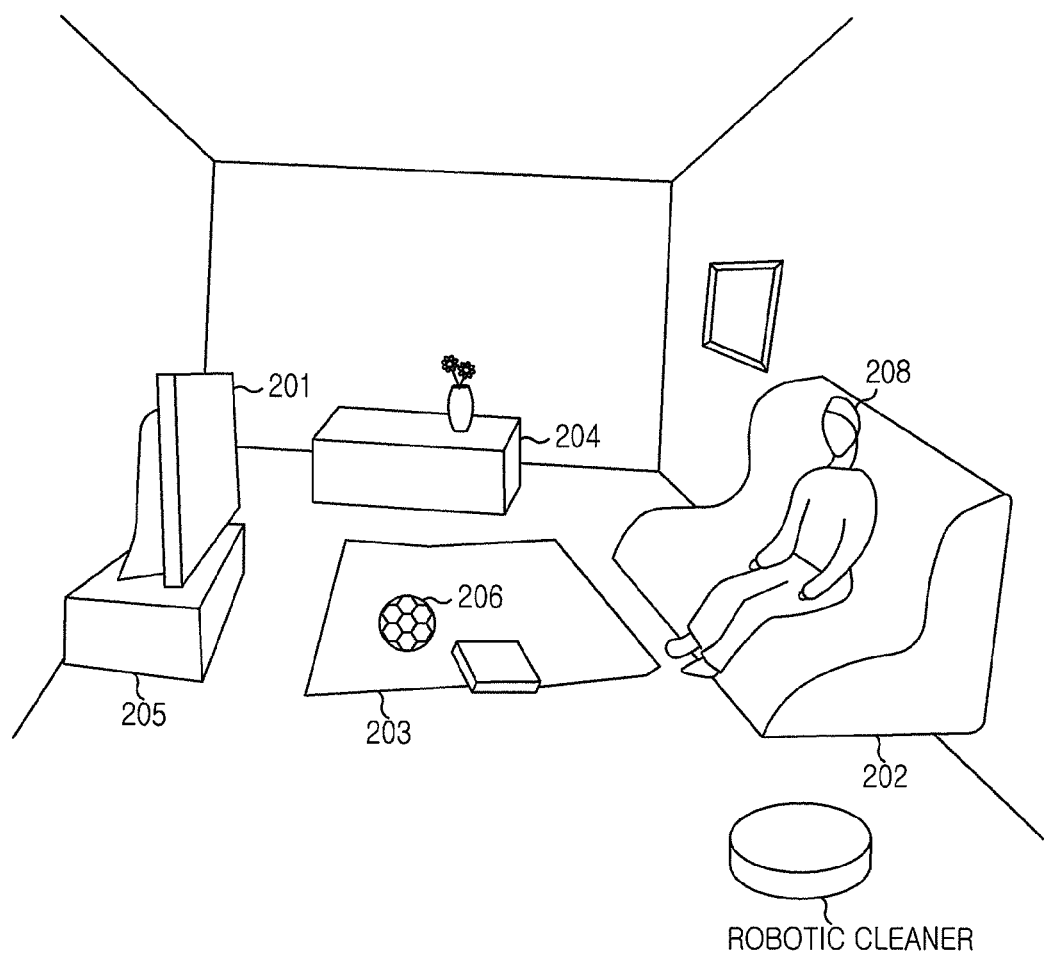
FIG. 2 shows an example of a living room including objects recognized by a robotic cleaner.

FIG. 2 shows an example of a living room including objects recognized by a robotic cleaner. Referring to FIG. 2, there are a television (TV) 201, a sofa 202, a carpet 203, a table 204, a stand 205, objects 206 (e.g., a ball, a book, and the like), and a human user 208. When it is assumed that the aforementioned 3D map has already been built, the robotic cleaner has information regarding the objects in the room. The robotic cleaner recognizes the presence of the human user 208, and recognizes that the human user 208 is watching the TV 201.

For example, the robotic cleaner can recognize that the human user 208 is watching the TV 201 according to the following method. By using the 3D map which has already been built, the robotic cleaner recognizes that the sofa 202 and the TV 201 face to each other. In this embodiment, if it is determined by using a sensor that an image is output from the TV 201 and the human user 208 is located in the sofa 202, the robotic cleaner can determine that the human user 208 is watching the TV 201. In another method, the robotic cleaner recognizes a face of the human user 208 by using the sensor.

If the recognition result shows that eyes of the human user 208 are directed to the TV 201, the robotic cleaner can determine that the human user 208 is watching the TV 201.

Accordingly, the robotic cleaner assigns a state of the TV 201 to 'SWITCHED ON', and assigns a state of the human user 208 to 'SITTING, WATCHING TV'. A state of the sofa 202 is assigned to 'OCCUPIED'. Further, the robotic cleaner assigns a state of the living room where the human user 208 is located to 'OCCUPIED'. This implies that the robotic cleaner does not operate in the living room even if the robotic cleaner has a schedule to clean the room. In addition, the robotic cleaner recognizes the objects 206 (e.g., the ball, the book, and the like). Since the robotic cleaner recognizes that the objects 206 must not be present in a cleaned room, the robotic cleaner assigns a task for confirming whether the objects 206 will be moved for a cleaning operation at a later time. Thereafter, during the scheduled cleaning task, the robotic cleaner confirms the human user 208, and compares a 3D map of the cleaned house with a current state. If new objects are detected, the robotic cleaner classifies the new objects. For example, the objects 206 will be classified into the ball and the book, and can be treated as an obstacle during the cleaning operation. Both of the 3D model of the cleaned house and the current 3D map have an object characteristic regarding a type of obstacles.

Figure 3:
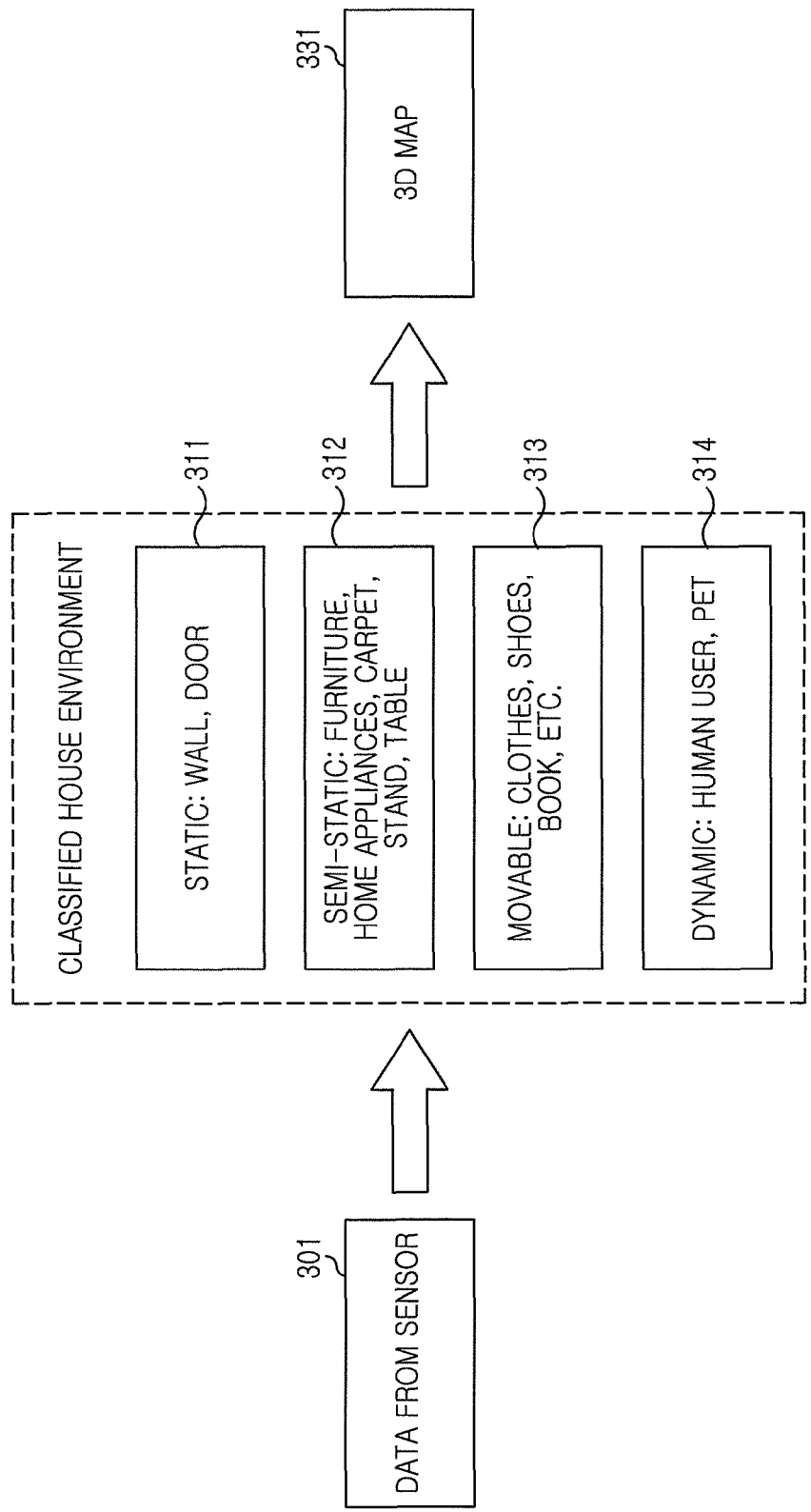
FIG. 3 illustrates an example of classifying objects according to an embodiment of the present disclosure.

FIG. 3 illustrates an example of classifying objects according to an embodiment of the present disclosure.

The objects can be classified by using data 301 from a sensor. For example, the wall 102 and the door 105 are classified as static objects 311. The furniture 101, electronic appliances (e.g., the TV 201), the sofa 202, the carpet 203, the stand 205, and the table 204 are classified as semi-static objects 312. The semi-static object 312 can be treated as an object which always exists in a map. The clothes 104 and the objects 206 (e.g., the ball, the book, and the like) are classified as movable objects 313. The movable object 313 can be treated as an obstacle during cleaning. A floor under the clothes 104 and the objects 206 are treated as not being cleaned, and is marked as 'TO CLEAN' during a next session. The human user 109, the pet, and the like, are classified as dynamic objects.

Figure 4:
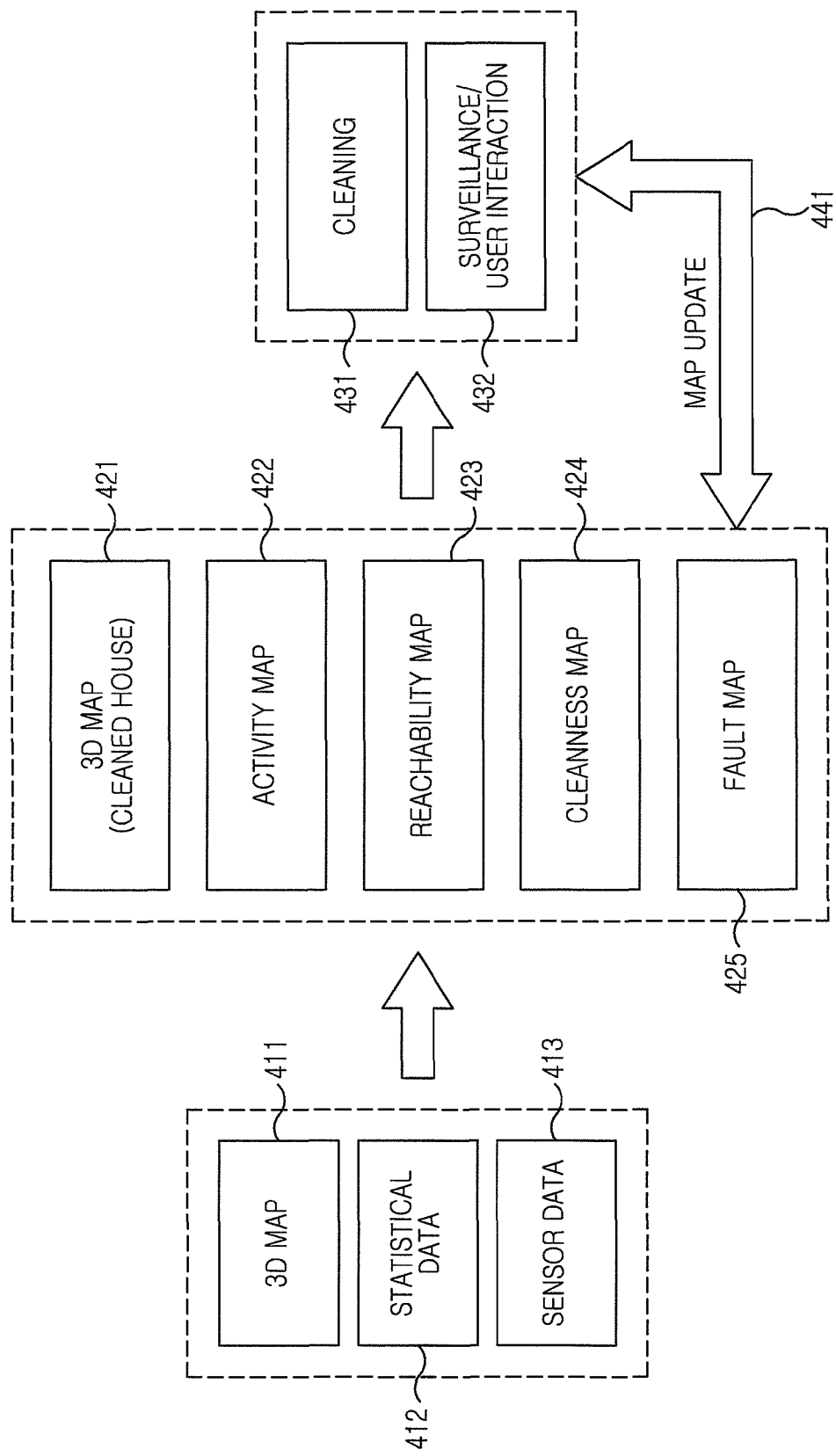
FIG. 4 illustrates map management according to an embodiment of the present disclosure.

A user can receive updated information regarding the cleaning operation using a 2D/3D map. The 2D/3D map represents a house including furniture and other objects. In addition, the map indicates a cleaned area, an uncleaned area, and an area to be cleaned. The robotic cleaner can generate a set of maps as illustrated in FIG. 4. FIG. 4 illustrates map management according to an embodiment of the present disclosure.

Referring to FIG. 4, a set of the maps is generated from a 3D map 411, statistical data 412, and sensor data 413 of the house. The set of the maps includes a 3D map 421, activity map 422, reachability map 423, cleanness map 424, fault map 425, and the like, of a cleaned house. A cleaning 431 and a surveillance/user interaction 432 are performed by using the set of the maps, and thus an update 441 can be performed again on the set of the maps.

Figure 5B:
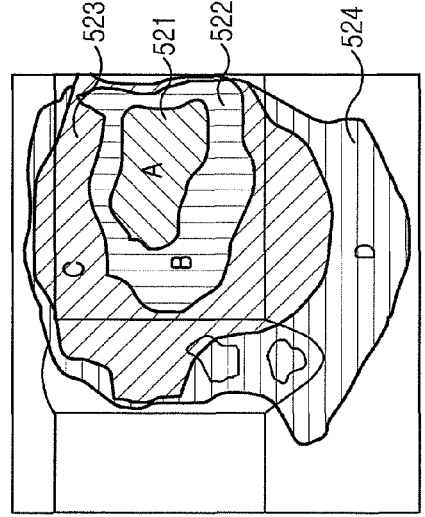
FIGS. 5A to 5C illustrate maps for a bedroom according to an embodiment of the present disclosure.
Figure 5A:
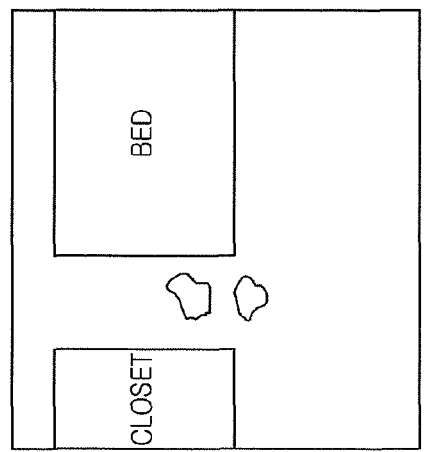
Figure 6A:
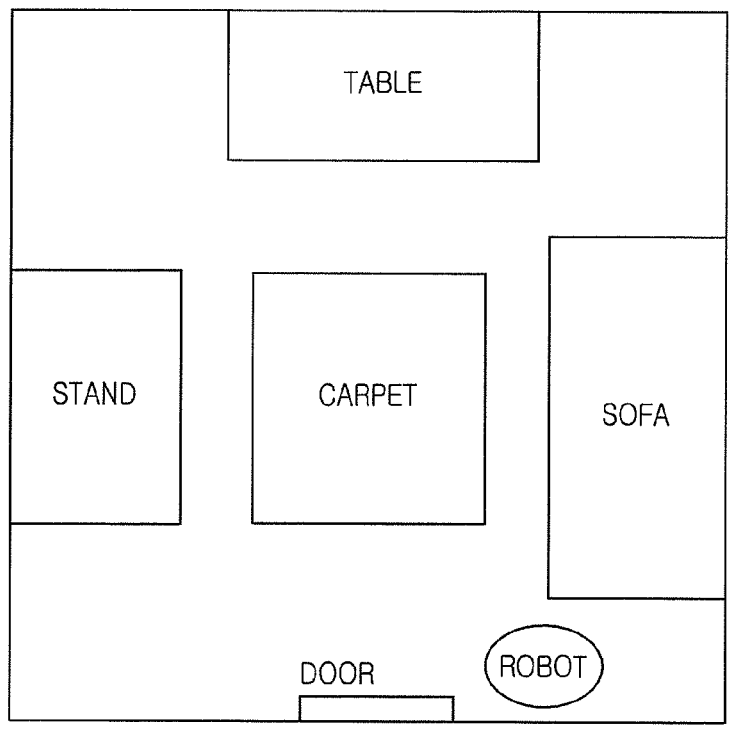
FIGS. 6A and 6B illustrate maps for a living room according to an embodiment of the present disclosure.

The 3D map 421 of the cleaned house is a map which is first built by the robotic cleaner. The 3D map 421 of the cleaned house shows a state of completing the cleaning. The 3D map 421 is built by using information measured by a sensor included in the robotic cleaner, that is, by using the sensor data 413. The sensor may include at least one of a camera, a laser ranger, a sonar, a bump sensor, and other sensors. The 3D map 421 stores information regarding all objects in a cleaning area. The 3D map 421 is used to analyze where to clean, how to operate in rooms, and how to track a difference of a home environment. The 3D map 421 can be shown to a user by using an apparatus including a display element such as a TV, a smart phone, and the like. The 3D map 421 is projected to a plane, and thus can be shown in a 2D image including house objects. For example, an embodiment of the 3D map 421 is illustrated in FIG. 5A and FIG. 6A. According to another embodiment of the present disclosure, a map showing the cleaned house can be built in a 2D manner.

Figure 6B:
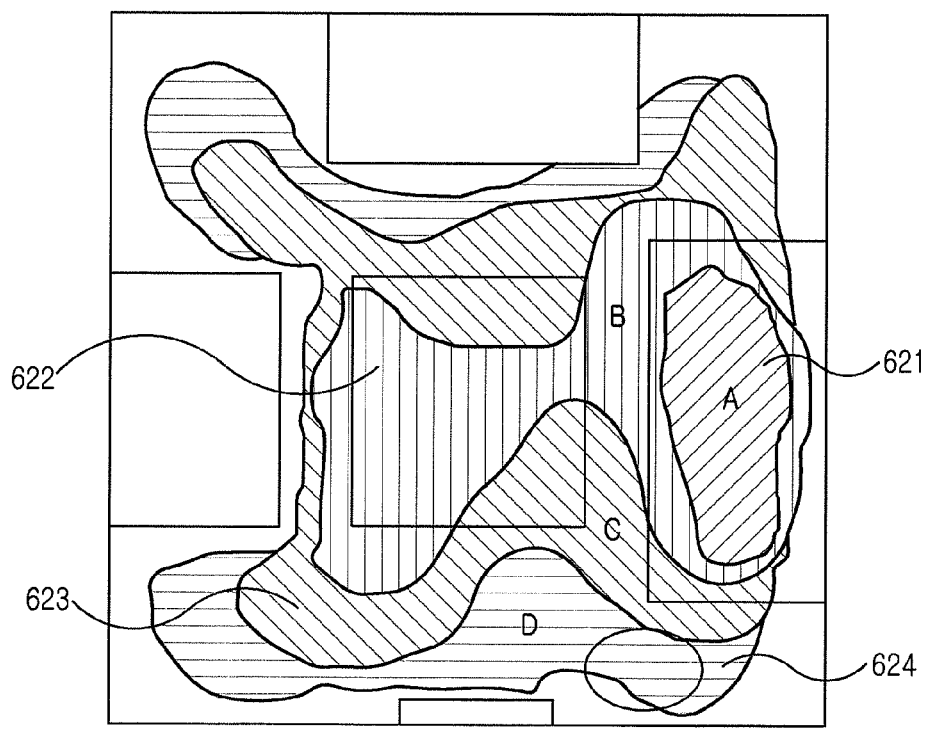

The activity map 422 shows an area in which dynamic objects (e.g., a human user, a pet, and the like) spend most of the time. That is, the activity map 422 shows activity of the dynamic objects. The robotic cleaner collects information regarding activity of the human user and the pet by using a camera, a laser ranger, and other sensors. By persistently monitoring the human user and the pet, the robotic cleaner generates the statistical data 412, and uses the statistical data 412 to build the activity map 422. FIG. 5B illustrates the activity map 422 for a bedroom, and FIG. 6B illustrates the activity map 422 for a living room. The activity map 422 can be represented such as a level area map. For example, in FIG. 5B, four levels 521 to 524 are present. The level A 521 indicates the most active area. The level B 522 and the level C 523 indicate a less active area. The level D 524 indicates the least active area. The FIG. 6B illustrates four levels 621 to 624. In addition, a grid map method can be applied to the activity map 422. In this embodiment, the activity map 422 can be split into a plurality of cells each having a different active level. Since a specific time is consumed to generate the activity map 422, the activity map 422 is initialized to have one active level, and is updated according to a specific fixed time period.

Figure 5C:
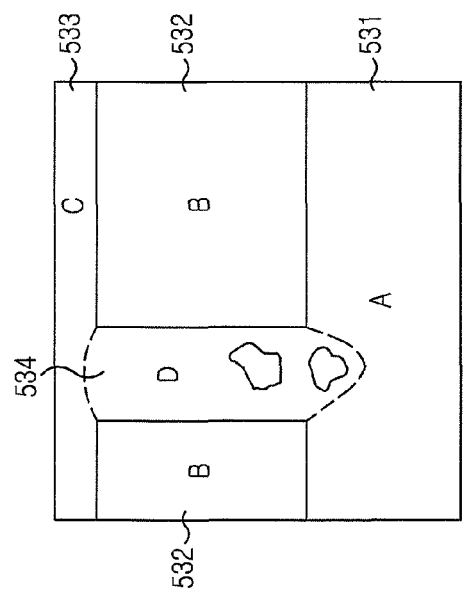

The reachability map 423 is associated with effective path planning and a coverage mission in a house. For example, FIG. 5C shows the reachability map 423 for the bedroom. The reachability map 423 has a plurality of levels. In the first level, the reachability map 423 is built for the 3D map 421 of the cleaned house, and includes a reachable floor area A 531, an unreachable area B 532, and an area C 533 reachable but not suitable for a robotic cleaning operation. For a 'FAST CLEAN' mode, the area C 533 can be omitted in the cleaning. The 'FAST CLEAN' mode can be set when there is a task in which the robotic cleaner is to complete cleaning within a specific time limit. In the second level, the reachability map 423 has movable obstacles such as clothes. Therefore, the reachability map 423 updates the area D 534 temporarily unreachable, and the robotic cleaner cleans the area A 531 except for the area D 534. After cleaning, the robotic cleaner sets the area D 534 as an additional cleaning task. Further, the robotic cleaner transmits a notification regarding a cleaning success, fault, a cause of fault, a proposed solution, and the like. For example, the notification may be a message such as 'The house is cleaned, but a bedroom floor is not completely cleaned due to clothes on the floor. Please, remove the clothes from the floor'.

The cleanness map 424 describes a cleaned area and an uncleaned area. An appearance of the cleanness map 424 may be similar to the activity map 422 as illustrated in FIG. 5B, but obstacles are not taken into account. The cleanness map 424 is updated after cleaning, and is obsolete over time. The obsoleteness can be represented by color for a user. For example, it is assumed that the cleanness map 424 consists of 1000 small cells. After cleaning the whole house, each cell has a 'CLEANED' state and a cleanness value 1. Over time, the cleanness value 1 is decreased at an exponential speed until it reaches a threshold. For example, the threshold may be 0.2 or 0.1. Further, a state of a corresponding cell can be changed to an 'UNCLEANED' state. Other states can be assigned between the 'CLEANED' state and the 'UNCLEANED' state. For example, a 'TO BE CLEANED' state can be assigned for a cleanness value 0.5.

The fault map 425 shows an area difficult to be cleaned by the robotic cleaner. That is, the fault map 425 shows an area having a difficulty in cleaning. The difficulty can be registered on the basis of a measured coverage speed. The measured coverage speed refers to a speed of moving and cleaning on the floor. The coverage speed can be measured by using a cleaned area divided by a cleaning time. If the robotic cleaner stops and does not clean a specific area, the coverage speed may be 0. In addition, if the coverage speed of the robotic cleaner is low or 0, the robotic cleaner may proceed cleaning slowly or may stop cleaning. That is, the low coverage speed indicates that there is a difficulty in cleaning. In other words, the area having a difficulty in cleaning is an area in which a cleaning progress speed of the robotic cleaner is less than or equal to a threshold. For example, the coverage speed may be decreased due to a narrow passage, a carpet, other obstacles, and the like. If the robotic cleaner is not movable or other exceptions are detected, the robotic cleaner cannot clean the floor. To improve the path planning and coverage of the robotic cleaner, the fault map 425 can be updated in an unreachable area of the reachability map 423. The fault map 425 consists of a plurality of small cells. Whenever the robotic cleaner obtains a fault message (e.g., the robotic cleaner cannot move, cleaning is very slow, and so forth), a value of a corresponding cell of the fault map 425 is set to 'FAULTY AREA'.

In addition, the user can approach and analyze the aforementioned maps, and also can facilitate the robotic cleaner to make a cleaning task more effectively and reliably. For example, the user can remove objects (e.g., clothes, books, balls, and the like) from the floor.

A cleaning operation according to an embodiment of the present disclosure is as follows.

The robotic cleaner uses the generated maps as follows. First, the robotic cleaner reads the cleanness map 424 and confirms whether cleaning has been complete at present. For this, three exemplary embodiments are described as follows.

According to a first embodiment, the robotic cleaner completes cleaning of the whole house. Then, the cleaning operation ends, and the robotic cleaner transitions to a surveillance/observation mode.

According to a second embodiment, the robotic cleaner does not clean during a specific time period, and a time for cleaning arrives again. The operations of the second embodiment will now be described.

1) The robotic cleaner reads a 3D map and its location on the map. 2) The robotic cleaner arranges the robotic cleaner itself in its subspace. Herein, the subspace implies a room in which the robotic cleaner is located at present. 3) The robotic cleaner assigns a subspace to be cleaned. 4) The robotic cleaner downloads a reachability map, and plans a path to the subspace assigned for cleaning.

Figure 7A:
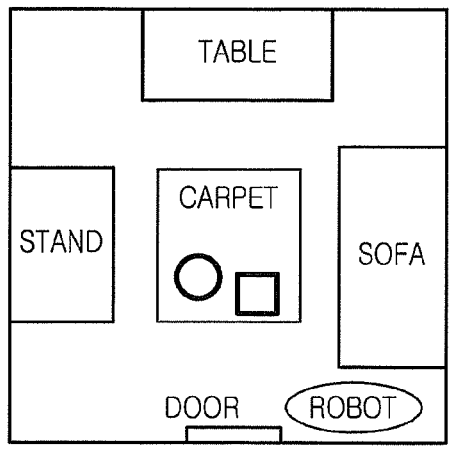
FIGS. 7A to 7D illustrate a cleaning operation according to an embodiment of the present disclosure.
Figure 7B:
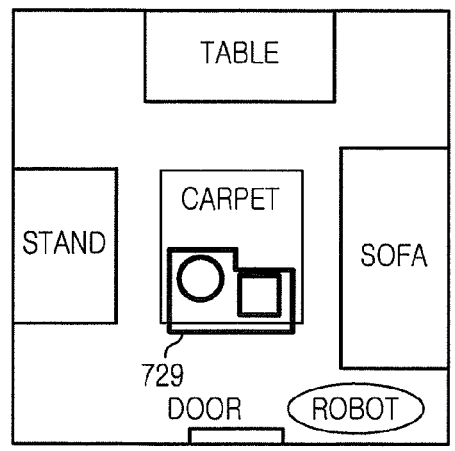
Figure 7C:
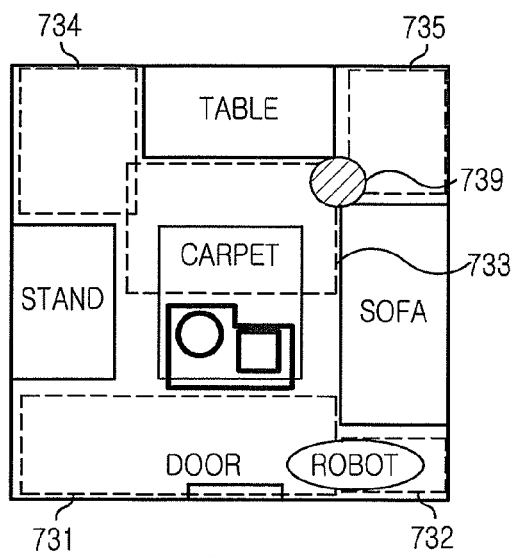
Figure 7D:
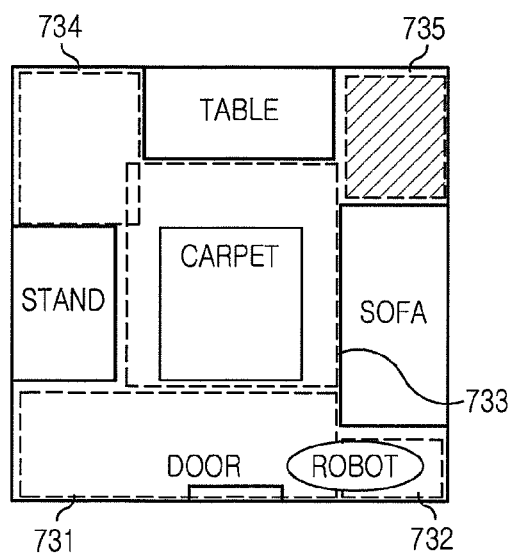

5) After reaching the subspace, the robotic cleaner downloads a fault map, an activity map, and a reachability map. By using the maps, the robotic cleaner generates a cleaning path. For this, the robotic cleaner cleans an area not including the fault area. For example, in FIG. 7A, the robotic cleaner assigns an obstacle area 729 of FIG. 7B. Further, as illustrated in FIG. 7C, the robotic cleaner assigns a plurality of rectangular areas 731 to 735 in a range other than the obstacle area 729. Furthermore, for example, as illustrated in FIG. 7D, the robotic cleaner can set a path such that the fifth area 735 is cleaned at a last moment after cleaning the remaining areas 731 to 734. The rectangular areas 731 to 735 are areas which can be cleaned faster and more effectively. The robotic cleaner may not clean the obstacle area 729 in a current cleaning operation and may store information indicating that cleaning is not made due to an obstacle. In FIG. 7C, a fault area 739 is indicated by a slash. The fault area 739 implies an area in which the robotic cleaner has previously experienced a certain difficulty in cleaning. In an active area of the downloaded activity map, the robotic cleaner may clean the area at a slow speed less than or equal to a threshold speed, but may use a vacuum cleaner switched to high power. One important aspect about performance of the vacuum cleaner is power of a suction motor. The suction motor attains electrical power from a power source, and converts the power into mechanical power in which an air flow is used for suction. Therefore, switching to high power implies that the robotic cleaner consumes relatively more electric energy for better cleaning.

6) After cleaning all areas, the robotic cleaner can clean the fault area 739 or can move to another subspace, that is, another room. When another new obstacle exists, the robotic cleaner updates the cleanness map, and generates a message for reporting to the user a reason of failure in cleaning in some areas. In other words, when the new obstacle is detected during the cleaning operation, the robotic cleaner updates the cleanness map, and generates a message for reporting to the user a reason of failure in cleaning in an area corresponding to the obstacle. For example, the reason may be an open door of a closet that can be recognized by the robotic cleaner. In this embodiment, the robotic cleaner can update information regarding the open door in a 3D map, and can transmit a notification to the user.

7) The robotic cleaner repeats the operations of 3) to 6) above until the whole house is cleaned. 8) After completion, the robotic cleaner can clean the fault area 739 of the fault map, and can attempt to clean an area associated with a difficulty in reaching in the reachability map. In other words, the robotic cleaner can attempt to clean an area having a difficulty in cleaning and indicated by the fault map, an area reachable but not suitable for a cleaning operation and indicated by the reachability map, and an area temporarily unreachable. 9) After completing the cleaning operation, the robotic cleaner transitions to a hibernation mode or a surveillance/observation mode.

The robotic cleaner has several selective functions, such as 'FAST CLEAN', 'NORMAL CLEAN', 'DILIGENT CLEAN', and the like.

In the 'FAST CLEAN' mode, the robotic cleaner cleans areas not included in the fault map, and does not clean areas difficult to be reached. The fault map indicates an area in which the robotic cleaner cannot move or an area which is to be cleaned at a very slow speed. The area difficult to be reached can be determined by downloading the reachability map.

In the 'NORMAL CLEAN' mode, the robotic cleaner performs cleaning according to the aforementioned second embodiment.

In the 'DILIGENT CLEAN' mode, the robotic cleaner performs cleaning similarly to the 'NORMAL CLEAN' mode except that, after completing cleaning, the robotic cleaner cleans areas having a high cleanness value in the cleanness map 424, cleans an area difficult to be reached, and cleans faulty areas. The area difficult to be reached can be determined from the reachability map 423, and the faulty area can be determined from the fault map 425.

A third embodiment is as follows. Although the robotic cleaner has already cleaned the house, there may be some uncleaned areas. The some uncleaned areas may include an area having a very low cleanness value in the cleanness map.

The cleaning operation of the third embodiment is similar to the example of the second embodiment. A difference between the two embodiments is that the robotic cleaner moves to the uncleaned area and then cleans the area. A reason of not being cleaned may be a previous cleaning fault. In this embodiment, the robotic cleaner determines whether the previous cleaning fault reason is removed. For example, the robotic cleaner determines whether objects such as clothes, balls, books, and the like, are removed or whether a door of a closet is closed at present. If the cause is removed, the robotic cleaner cleans a corresponding area and updates the maps. Otherwise, if the cause is not removed, the robotic cleaner moves to another uncleaned area. In a last repetition, the cleaning operation ends, and the robotic cleaner transitions to a hibernation mode or a surveillance/observation mode.

The surveillance/observation mode will be described as follows.

A main purpose of the robotic cleaner is to clean the house. Therefore, in the surveillance/observation mode, the robotic cleaner collects information related to cleaning. In the surveillance/observation mode, the robotic cleaner monitors activity of human users and pets to update the activity map. Further, if a specific part of the house is dirty or has a possibility of being dirty, the robotic cleaner can update the cleanness map. For example, there may be a situation where a user or children of the user eat food and thus a floor may be tainted by small fragments of the food. In addition, when a visitor visits the house of the user, the cleanness map can be updated, and a time interval to a next cleaning time can be decreased. The robotic cleaner may have a capability of being located away from people so that they do not feel uncomfortable due to the existence of the robotic cleaner. Further, the robotic cleaner may have a function for discontinuously observing human activity. For example, the robotic cleaner may observe the activity for 10 seconds in every 30 minutes, and may interpolate observation data.

If the user does not want the robotic cleaner to perform observation and examination due to a personal reason or the like, the user can easily switch on/off the robotic cleaner.

After collecting essential information such as human activity, statistics on cleaning, and the like, the robotic cleaner may show a 3D map in which an area having a problem in cleaning is emphasized, and may propose to rearrange furniture for more effective cleaning.

Figure 8:
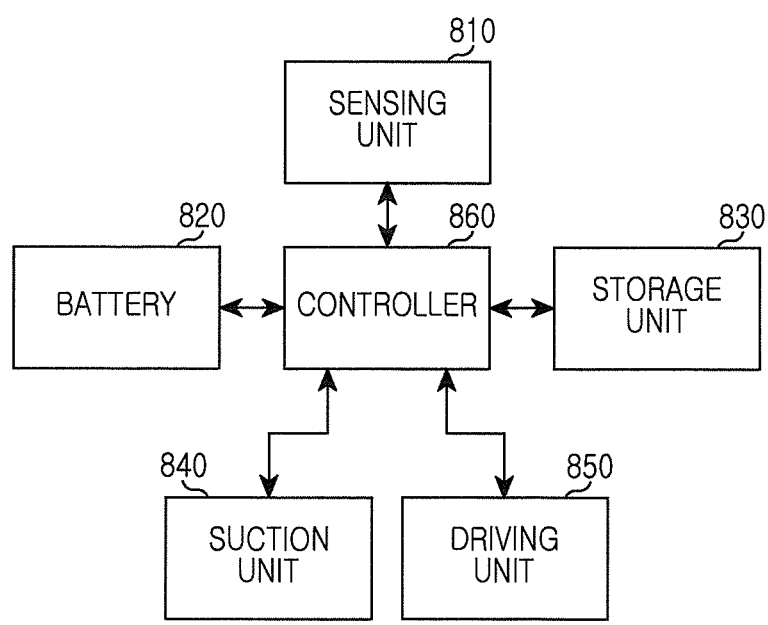
FIG. 8 is a block diagram illustrating a structure of a robotic cleaner according to an embodiment of the present disclosure.

FIG. 8 is a block diagram illustrating a structure of a robotic cleaner according to an embodiment: of the present disclosure.

Referring to FIG. 8, the robotic cleaner includes a sensing unit 810, a battery 820, a storage unit 830, a suction unit 840, a driving unit 850, and a controller 860.

The sensing unit 810 collects information used by the robotic cleaner to determine a surrounding environment (e.g., an obstacle location, a cleaning space, and the like). The sensing unit 810 includes at least one sensor. For example, the sensing unit 810 may include a camera, a laser ranger, a sonar, a bump sensor, and other sensors that can be used and placed in the robotic cleaner. The battery 820 supplies power for an operation of the robotic cleaner. The battery 820 may be a chargeable battery. The storage unit 830 stores a program and configuration information associated with the operation of the robotic cleaner, and stores map data and measurement data. In particular, the storage unit 830 stores a program for a cleaning operation according to the aforementioned embodiments of the present disclosure. The suction unit 840 sucks air and collects dust on the floor. The driving unit 850 provides physical power for moving the robotic cleaner. For example, the driving unit 850 may include at least one motor and at least one wheel.

The controller 860 controls an overall operation of the robotic cleaner. For example, the controller 860 provides control such that cleaning is performed by using the aforementioned cleaning operation according to the embodiments. More specifically, the controller 860 provides control to generate at least one map including information regarding a space to be cleaned by using information measured by at least one sensor included in the sensing unit 810, to set a cleaning path by using the at least one map, and to perform cleaning according to the cleaning path. For example, the controller 860 sets an obstacle area on the space, and sets at least one rectangular area in an area other than the obstacle area. In addition, the controller 860 provides control to perform cleaning at a speed less than or equal to a threshold speed in an active area indicated by the activity map. Further, when a new obstacle is detected during the cleaning operation, the controller 860 updates the cleanness map, and generates a message for reporting to the user a reason of failure in cleaning in an area corresponding to the obstacle. Furthermore, after completion of the cleaning, the controller 860 attempts to clean an area having a difficulty in cleaning and indicated by the fault map, an area reachable but not suitable for a cleaning operation and indicated by the reachability map, and an area temporarily unreachable.

Since the robotic cleaner performs cleaning by using information related to activity, reachability, cleanness, and cleaning faults, a cleaning operation can be effectively performed.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to operate a robotic cleaner, the method comprising:
   generating at least one map including information regarding a space to be cleaned using information measured by at least one sensor;
   setting a cleaning path as a function of a plurality of cleanliness values corresponding to a plurality of areas within the space using the at least one map; and
   operating the robotic cleaner to clean along the cleaning path,
   wherein the at least one map includes at least one of a first map that indicates a cleaning complete state, a second map that indicates activity of dynamic objects, a third map that indicates reachability of the robotic cleaner, a fourth map that indicates a cleaning state, and a fifth map that indicates a difficult area to be cleaned, and
   wherein the cleanliness values indicate values of a clean state corresponding to the areas.

2. The method of claim 1, wherein the first map includes information regarding objects in the space to be cleaned.

3. The method of claim 1, wherein the second map represents the activity of the dynamic objects using one of a level area map and a grid map.

4. The method of claim 1, wherein the third map indicates at least one of a reachable area, an unreachable area, an area reachable but not suitable to clean, and an area temporarily unreachable.

5. The method of claim 1, wherein the fourth map indicates at least one cleaned area and at least one uncleaned area.

6. The method of claim 5, wherein each of the cleanliness values indicates an amount of cleanness relative to a maximum cleanliness value attained immediately after a cleaning, and wherein the value of the uncleaned area is less than a threshold value.

7. The method of claim 1, wherein the difficult area to be cleaned includes an area in which a cleaning progress rate is less than or equal to a threshold rate.

8. The method of claim 1, wherein setting the cleaning path comprises:
   setting an obstacle area in the space; and
   setting at least one rectangular area in a range other than the obstacle area.

9. The method of claim 1, wherein cleaning along the cleaning path comprises cleaning at a rate less than or equal to a threshold rate in an active area indicated by the second map.

10. The method of claim 1, further comprising:
    in response to detecting an obstacle while the robot cleaner is cleaning, updating the fourth map; and
    generating a message to report a reason for failing to clean in an area occupied by the obstacle.

11. The method of claim 1, further comprising:
    after the cleaning is complete, attempting to clean one of the difficult area to be cleaned, the area reachable but not suitable to clean using the robotic cleaner, and an area temporarily unreachable.

12. A robotic cleaner apparatus comprising:
    a suction unit configured to collect dust from a surface;
    a driving unit configured to move the robotic cleaner apparatus; and
    a controller configured to:
        generate at least one map including information regarding a space to be cleaned using information measured by at least one sensor,
        set a cleaning path as a function of a plurality of cleanliness values corresponding to a plurality of areas within the space using the at least one map, and operate the robotic cleaner apparatus to clean along the cleaning path, wherein the at least one map includes at least one of a first map that indicates a cleaning complete state, a second map that indicates activity of dynamic objects, a third map that indicates reachability of the robotic cleaner, a fourth map that indicates a cleaning state, and a fifth map that indicates a difficult area to be cleaned, and wherein the cleanliness values indicate values of a clean state corresponding to the areas.

13. The apparatus of claim 12, wherein the first map includes information regarding objects in the space to be cleaned.

14. The apparatus of claim 12, wherein the second map represents the activity of the dynamic objects using one of a level area map and a grid map.

15. The apparatus of claim 12, wherein the third map indicates at least one of a reachable area, an unreachable area, an area reachable but not suitable to clean, and an area temporarily unreachable.

16. The apparatus of claim 12, wherein the fourth map indicates at least one cleaned area and at least one uncleaned area.

17. The apparatus of claim 16, wherein each of the cleanliness values indicates an amount of cleanness relative to a maximum cleanliness value attained immediately after a cleaning, and wherein the value of the uncleaned area is less than a threshold value.

18. The apparatus of claim 12, wherein the difficult area to be cleaned includes an area in which a cleaning progress rate is less than or equal to a threshold rate.

19. The apparatus of claim 12, wherein the controller is configured to set an obstacle area in the space, and set at least one rectangular area in a range other than the obstacle area.

20. The apparatus of claim 12, wherein the controller is configured to clean at a rate less than or equal to a threshold rate in an active area indicated by the second map.

21. The apparatus of claim 12, wherein in response to detecting an obstacle while the robotic cleaner apparatus is cleaning, the controller is configured to update the fourth map, and generate a message to report a reason for failing to clean an area occupied by the obstacle.

22. The apparatus of claim 12, wherein after the cleaning is complete, the controller is configured to attempt to clean one of the difficult area to be cleaned, the area reachable but not suitable to clean, and an area temporarily unreachable.

* * * * *